United States Patent [19]

Schierlinger et al.

[11] Patent Number: 5,788,880
[45] Date of Patent: Aug. 4, 1998

[54] LIQUID-CRYSTALLINE ORGANOSILOXANES CONTAINING CHIRAL DIANHYDROHEXITOL DERIVATIVES

[75] Inventors: Christian Schierlinger, Markte; Rainer Winkler, München; Klaus Stowischek, Waldkraiburg, all of Germany

[73] Assignee: Consortium für elektrochemische Industrie GmbH, Munich, Germany

[21] Appl. No.: 743,440

[22] Filed: Nov. 1, 1996

[30] Foreign Application Priority Data

Nov. 9, 1995 [DE] Germany ............ 195 41 820.4

[51] Int. Cl.$^6$ ............ C09K 19/34; C09K 19/32; C07D 305/00
[52] U.S. Cl. ............ 252/299.61; 252/299.62; 549/214
[58] Field of Search ............ 252/299.01, 299.61, 252/299.62; 549/214

[56] References Cited

U.S. PATENT DOCUMENTS 4,996,330  2/1991  Scherowsky et al. ............ 548/544
5,211,877  5/1993  Andrejewski et al. ............ 252/299.01
5,502,206  3/1996  Zahn et al. ............ 548/406

FOREIGN PATENT DOCUMENTS 0358208  3/1990  European Pat. Off.
0626386  11/1994  European Pat. Off.
4234845  4/1994  Germany.
4342280  6/1995  Germany.
4408171  9/1995  Germany.

OTHER PUBLICATIONS

H. Finkelmann, H. Ringsdorf et al., Macromol. Chem. 179,829–832 (1978) "Synthesis of cholesteric Liquid Crystalline Polymers".

W. Noll: Chemistry and Technology of Silicones Academic Press, Orlando, Fla., 1968, pp. 191–239 "Preparation of Polyorgano Siloxanes".

*Primary Examiner*—Shean C. Wu
*Attorney, Agent, or Firm*—Brooks & Kushman

[57] ABSTRACT

The liquid-crystalline organosiloxanes which contain dianhydrohexitol derivatives as chiral groups can be used in optical elements, for decorative purposes and as polarizing colored filters, in particular notch filters.

9 Claims, No Drawings

LIQUID-CRYSTALLINE ORGANOSILOXANES CONTAINING CHIRAL DIANHYDROHEXITOL DERIVATIVES

FIELD OF INVENTION

The present invention relates to liquid-crystalline organosiloxanes which contain dianhydrohexitol derivatives as chiral groups, a process for their preparation and use, to dianhydrohexitol derivatives, organosilanes which can be condensed to form liquid-crystalline organosiloxanes containing dianhydrohexitol derivatives, and to mixtures of organosiloxanes containing dianhydrohexitol derivatives with other liquid-crystalline materials, and applications using these mixtures.

BACKGROUND OF INVENTION

Liquid-crystal materials having a helical structure have smectic, nematic or cholesteric phases. Liquid-crystal mixtures frequently contain one or more optically active components for induction of a chiral structure. For example, cholesteric liquid crystals can comprise a nematic base material and one or more optically active dopes, which produce either a right-handed or a left-handed twist in the nematic material. Cholesteric liquid crystals reflect light in a wavelength range for which the wavelength is approximately equal to the helix pitch ($\lambda=n\cdot p$). The reflected light is fully circular-polarized. The direction of rotation of the reflected light depends on the direction of rotation of the cholesteric helix structure. The light which is circular-polarized in the opposite direction is transmitted at the same intensity. A large number of optically active dopes which are suitable for certain purposes are known.

For optical applications of liquid-crystalline materials, for example in notch filters, it is necessary to have cholesteric phases with a right-handed helix and those with a left-handed helix in order to be able to reflect both left-handed and right-handed circular-polarized light. For left-handed helical filters, cholesterol compounds which, in addition to the chirality, also provide a mesogenic property to produce a stable mesophase are used. Suitable compounds are the cholesterol derivatives disclosed by H. Finkelmann, H. Ringsdorf et al., in Macromol. Chem. 179, 829–832 (1978) or the tartarimide derivatives disclosed in U.S. Pat. No. 4,996,330 and EP-A-626 386. For the production of right-handed helical filters, use has been made of non-steroidal systems. These systems usually do not have adequate mesophase stability or have low long-term stability. A suitable right-handed helical steroid system is described in DE-A-42 34 845. However, the cholest-8(14)-en-3β-ol (Doristerol) described therein, and derivatives thereof, have the disadvantage of a complex synthesis and a high production price.

Low-molecular-weight systems are suitable for limited applications, such as optical elements, applications in the decorative sector or in optical filters. Frequently, their phase stability is too low, their viscosity is too low or, their heat stability is not guaranteed.

Polymers or crosslinked cholesteric liquid crystals enable wider applications. They can be used for the production of LC pigments having novel effects or reflective polarizing filters and much more.

DE-A-43 42 280 and DE-A-44 08 171 describe crosslinkable, monomeric hexitol derivatives and mixtures of monomeric hexitol derivatives with other liquid-crystalline compounds. The monomeric hexitol derivatives can be used as monomeric dopes for the production of cholesteric networks. The hexitol-containing systems described are only accessible by means of complex syntheses. The monomeric hexitol derivatives described in DE-A-43 42 280 can be polymerized via vinyl or epoxide radicals. The mixtures of monomeric hexitol derivatives described in DE-A-44 08 171 can be crosslinked by means of free-radical or ionic polymerization processes.

Liquid crystals which comprise an organosiloxane skeleton carrying mesogenic side groups are distinguished over non-siloxane-containing LC systems in that the molecular weight can be varied as desired through the choice of the organosiloxane backbone. This allows the liquid-crystalline properties, such as the phase behavior, glass transition temperature and clearing point, or, the viscosity to be matched to requirements over broad ranges.

U.S. Pat. No. 5,211,877, DE-A-42 34 845 and EP-A 626 386, describe cyclic siloxanes containing mesogenic side groups in which some of the side groups have been esterified with methacrylic acid. These siloxanes can also be crosslinked. The dopes incorporated into these polymers are, hydrosilylated ω-olefin derivatives of cholesterol, doristerol or tartarimides. However, these have only a relatively low helical twisting power (HTP) and must be added in relatively large amounts (>approx. 10–20%) in order to produce color effects in the visible region. The large amount of dope means that the crosslinker group density cannot be chosen to be very high. In addition, the chiral dopes are expensive or only accessible by means of multistep syntheses.

SUMMARY OF INVENTION

The object of the present invention was to provide right-handed and left-handed helical liquid-crystalline organosiloxanes which contain more suitable chiral compounds having a relatively high HTP, have a stable or crosslinking-fixable cholesteric phase in the temperature range from room temperature to about 100° C., enable selective reflection of right- or left-handed polarized light and have a reflection wavelength which is temperature-independent.

The above mentioned objects are achieved by the present invention by means of liquid-crystalline organosiloxanes containing dianhydrohexitol derivatives as chiral groups.

The liquid-crystalline organosiloxanes have a higher HTP per dianhydrohexitol group and a better optical twisting power than the steroid- and tartarimide-containing liquid-crystalline organosiloxanes described, so that considerably smaller amounts of chiral dianhydrohexitol derivatives as chiral component need to be used in order to achieve the same optical effect, for example, to achieve the same reflection wavelength.

In addition, the liquid-crystalline organosiloxanes have a greater HTP and a better optical twisting power per dianhydrohexitol group than the low-molecular-weight dianhydrohexitol derivatives, so that smaller amounts of dianhydrohexitol groups are used in order to achieve the same optical effect. The cyclic organosiloxanes containing tartarimide radicals which are described in EP-A-626 386 do not have a greater HTP than the corresponding low-molecular-weight tartarimide derivatives.

Dianhydrohexitols are, as dianhydro derivatives of sugar alcohols, provided with two hydroxyl groups and are thus bifunctional. They can easily be derivatized in virtually any manner using the methods of organic chemistry.

Depending on the other compounds hydrosilylated onto the organosiloxane, a stable cholesteric phase can be obtained after alignment at room temperature, after alignment above the glass transition temperature and quenching to get the glass state or by fixing the alignment by polymerization at room temperature or elevated temperature. The liquid-crystalline organo-siloxanes containing dianhydrohexitol derivatives allow both a right-handed and a left-handed helix to be induced. Both the left-handed and the right-handed helical liquid-crystalline organosiloxanes exhibit selective reflection of left- or right-handed polarized light respectively.

In addition to the chiral dianhydrohexitol derivatives, the liquid-crystalline organosiloxanes also contain, as chiral component, other mesogenic radicals which enable free-radical or ionic crosslinking.

By varying the content of chiral dianhydrohexitol-containing radicals and the ratio between dianhydrohexitol-containing radicals and other mesogenic radicals in the liquid-crystalline organosiloxanes, the reflection wavelength of selective reflection can be adjusted. Owing to the large HTP values, a proportion of only 2–10 mole %, based on all the mesogenic radicals present in the organosiloxanes, of dianhydrohexitol-containing radicals is needed to obtain reflection in the visible region, whereas between 40 and 50 mole % of cholesteryl radicals are needed in the case of the corresponding cholesterol-containing organosiloxanes and between 10 and 20 mole % of tartarimide radicals are needed for the corresponding tartarimide-containing organosiloxanes.

The dianhydrohexitol derivatives contain one of the existing dianhydrohexitol groups, namely dianhydrosorbitol, dianhydromannitol or dianhydroiditol, having the formula

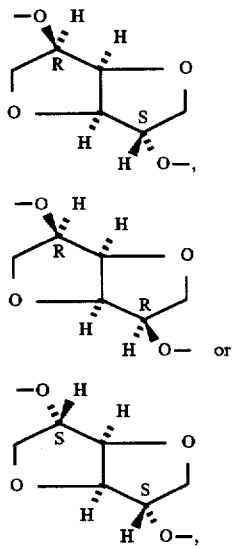

where the designations R and S define the absolute configuration at the particular carbon atom in accordance with the R/S nomenclature of Cahn, Ingold and Prelog.

The liquid-crystalline organosiloxanes contain, per molecule, at least one Si—C-bound dianhydrohexitol derivative of the formula $$M^1\text{-hexitol-}M^2 \tag{1}$$

as chiral component, where
hexitol represents one of the above dianhydrohexitol groups
$M^1$ is a radical of the formula

and
$M^2$ is a radical of the formula (2) or a radical of the formula

where, in above formulae (2) and (3), $R^1$ and $R^3$ are each a radical of the formula $C_nH_m$, in which one or more nonadjacent methylene units may be replaced by oxygen atoms or dimethylsilyl radicals, $R^2$ is a polymerizable ethylenically unsaturated or alkoxysiloxy group or cholesteryl radical, doristerol radical, halogen atom, hydrogen atom, hydroxyl group, nitrile group or trialkylsiloxy group whose alkyl radicals each have 1 to 8 carbon atoms, $A^1$, $A^2$, $A^3$ and $A^4$ are identical or different divalent radicals, namely 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms, $X^1$ and $X^2$ are identical or different divalent radicals from the group consisting of —OCO—, —NHCO—, —CO— or a radical $R^1$, $Z^1$ and $Z^2$ are identical or different divalent radicals from the group consisting of —$(CH_2)_q$—, —COO—, —CH=CH—, —N=N—, —N=N(O)—, —OCO—, —$CH_2CO$—, —$COCH_2$—, —$CH_2$—O—, —O—$CH_2$—, —$CH_2$—NH—, —NH—$CH_2$—, —CONH—, —NHCO—, —N=CH— or —CH=N—, a, b, c and d are each identical or different integers having a value of 0, 1, 2 or 3, n is an integer having a value of from 0 to 20, m has the value 2n or (2n–2), if n is at least 2, q is an integer having a value of 1, 2 or 3, and r and s are each an integer having a value of 0 or 1.

The liquid-crystalline organosiloxanes are built up in accordance with the formulae

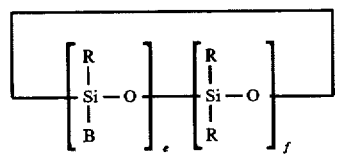 (4)

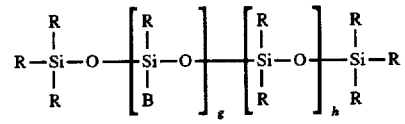 (5)

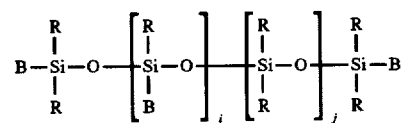 (6)

where
B is a radical of formula (1) or a radical of the formula

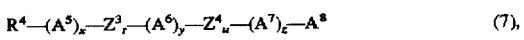 (7), where, in the above formulae (4) to (7),

R are identical or different, optionally substituted $C_1$- to $C_{18}$-hydrocarbon radicals, e and g are each an integer having a value from 1 to 100, f, h, i and j are each an integer having a value from 0 to 100, $R^4$ is as defined for $R^1$, $A^5$, $A^6$ and $A^7$ are as defined for $A^1$, $Z^3$ and $Z^4$ are as defined for $Z^1$, $A^8$ is a saturated or olefinically unsaturated, optionally substituted alkyl, alkoxy or cycloalkyl radical, having 1–16 carbon atoms, cholestane radical, cholesteryl radical, doristerol radical, halogen atom, hydrogen atom, hydroxyl group, nitrile group, (meth)acryloxy group, (meth)acryloxyethyleneoxy group, (meth)acryloxydi(ethyleneoxy) group, (meth)acryloxytri(ethyleneoxy) group, R- or S-tetrahydrofurancarboxylate group or trialkyl- or trialkoxysiloxy group whose alkyl or alkoxy radical respectively have 1 to 8 carbon atoms, x, y and z are each identical or different integers having a value of 0, 1, 2 or 3, and t and u are as defined for r, with the proviso that the sum e+f is at least 2.

Examples of $R^1$, $R^3$ and $R^4$ are linear or branched, saturated divalent alkyl radicals, which can be interrupted or replaced by units $[O(CH_2)_v]_w$, where v and w are each identical or different integers having a value of 1, 2, 3 or 4. For example, the unit $[O(CH_2)_v]_w$ can be a polyethylene glycol-polypropylene glycol block copolymer. In particular, n has a value of 3, 4, 5 or 6, and m preferably has the value 2n.

The polymerizable ethylenically unsaturated group $R^2$ can be a methacryloxy, acryloxy, vinyloxy, ethyleneoxy or styryl group. Examples of alkoxysiloxy groups $R^2$ are trialkoxysiloxy and alkyldialkoxysiloxy groups whose alkyl and alkoxy radicals have 1 to 8 carbon atoms. Examples of suitable alkyl radicals and of the alkyl radicals present in the alkoxy radicals are listed below under the radicals R. The alkyl and alkoxy radicals preferably have 1, 2 or 3 carbon atoms.

Preferred substituents for the substituted arylene radicals and substituted cycloalkylene radicals $A^1$, $A^2$, $A^3$, $A^4$, $A^5$, $A^6$ and $A^7$ are halogen atoms, $C_1$- to $C_4$-alkyl or alkoxy radicals, nitro groups or cyano groups.

The sums a+b and c+d are each 1 or 2.

Examples of R are alkyl radicals, such as the methyl, ethyl, n-propyl, isopropyl, n-butyl, isobutyl, tert-butyl, n-pentyl, isopentyl, neopentyl and tertpentyl radicals; hexyl radicals, such as the n-hexyl radical; heptyl radicals, such as the n-heptyl radical; octyl radicals, such as the n-octyl radical, and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl, allyl and 3-butenyl radicals; cycloalkyl radicals, such as cyclopentyl, cyclohexyl and cycloheptyl radicals, and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical, and the α- and β-phenylethyl radicals. Preferred substituents for the substituted hydrocarbons are halogen atoms, nitro groups and cyano groups.

Preferred radicals R are $C_1$- to $C_4$-alkyl radicals and phenyl radicals, in particular methyl radicals.

Suitable halogen atoms are fluorine, chlorine, bromine and iodine, in particular fluorine, chlorine and bromine.

Preferably e and g are each an integer having a value of at least 1, in particular at least 2, and f, h, i and j are each an integer from 0 to 35. The sum e+f is at least 4 and at most 15. The sum g+h is at least 2 and at most 35. The sum i+j is at most 10.

Examples of suitable saturated or olefinically unsaturated alkyl, alkoxy or cycloalkyl radicals for $A^8$, having 1–16 carbon atoms, are listed above under the radicals R. The alkyl and alkoxy radicals preferably have 1 to 8 carbon atoms. Examples of substituted radicals $A^8$ are cyanoalkyl radicals, such as the 2-cyanoethyl radical, haloalkyl radicals, in particular perfluoroalkyl radicals, such as the heptafluoropropyl radical, haloaryl radicals, such as the o-, m- and p-chlorophenyl radicals, and cyanoaryl radicals, such as the cyanophenyl radical.

Preferred substituents are halogen atoms, nitro groups or cyano groups.

The sum of x+y+z is preferably 1, 2 or 3, and the sum of t+u is preferably 1 or 2.

Preferred compounds of the formula (1) are dianhydrohexitol derivatives in which $M^1$, i.e. the formula (2), is the formula

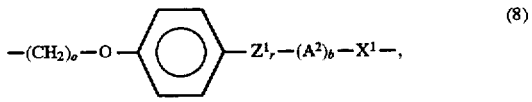

in which o is the number 3 or 4, and $Z^1$, $A^2$, $X^1$, r and b are as defined above.

Hexitol is preferably dianhydrosorbitol or dianhydromannitol.

Preferred compounds of the formula (7) are those of the formula

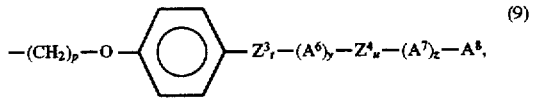

in which p is the number 3 or 4, and $Z^3$, $Z^4$, $A^6$, $A^7$, $A^8$, t, u, y and z are as defined above.

Preferably t has the value 1, and y and z each have the value 0 or 1. If y has the value 1, u can have the value 0 or 1, and if y has the value 0, u has the value 0.

The liquid-crystalline organosiloxanes containing dianhydrohexitol derivatives can be prepared by reacting organosiloxanes and/or organosilanes which can be condensed to form organosiloxanes with alkenes or alkynes of formula (1) and, optionally, of formula (7) which contain mesogenic groups, where the organosiloxanes and at least some of the organosilanes contain at least one hydrogen atom bonded directly to silicon.

In a preferred process for the preparation of liquid-crystalline organosiloxanes of the preferred formulae (4)–(6) above containing dianhydrohexitol derivatives, organosiloxanes of the formulae

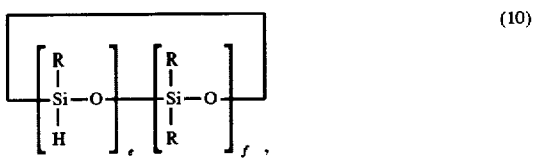

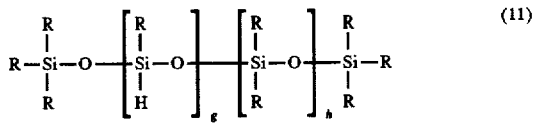

-continued

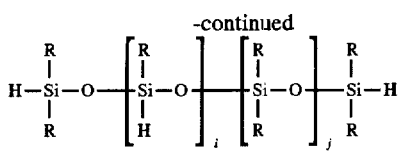
(12)

and/or organosilanes of the formula

 (13), are reacted with compounds of the formula

 (14), and, optionally, compounds of the formula

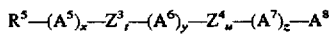 (15), and, if organosilanes of formula (13) are used, the resultant organosilanes of the formula

 (16)

are condensed, where, in the above formulae (10) to (16), $M^3$ is a radical of the formula

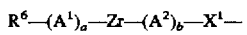 (17)

$Y^1$ is a condensable group, $Y^2$ is a condensable group or a radical R $R^5$ and $R^6$ are each a radical of the formula $C_\alpha H_\beta$, in which one or more nonadjacent methylene units may be replaced by oxygen atoms or dimethylsilyl radicals, and where $\alpha$ is as defined for n, and $\beta$ has the value $2\alpha-1$ or $2\alpha-3$, and R, $M^2$, $A^1$, $A^2$, $A^5$, $A^6$, $A^7$, $A^8$, $Z^1$, $Z^3$, $Z^4$, B, $X^1$, a, b, e, f, g, h, i, j, t, u, r, x, y and z are as defined above.

If $Y^2$ is not R, $Y^1$ and $Y^2$ are preferably a halogen atom or a $C_1$ to $C_4$-alkoxy group, in particular a chlorine atom or a methoxy or ethoxy group.

In formulae (15) and (17) above, $R^5$ and $R^6$ are terminally unsaturated. $\alpha$ has a value of from 3 to 7, preferably a value of 3 or 4.

Preferred compounds of formula (15) are those of the formula

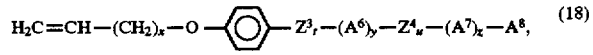 (18)

wherein $\chi$ is the number 1 or 2, and $Z^3$, $Z^4$, $A^6$, $A^7$, $A^8$, t, u, y and z are as defined above.

The compounds of formulae (14) and (15) can be hydrosilylated directly on hydrogen atoms bonded to silicon.

The preferred values and sums given above for formulae (4) to (6) and for e, f, g, h, i and j also apply to formulae (10) to (12).

The reaction of organosiloxanes containing hydrogen atoms bonded directly to silicon and/or of organosilanes which can be condensed to form organosiloxanes with alkenes or alkynes of formulae (14) and (15) is carried out by hydrosilylation in solvents, such as hydrocarbons, ethers or esters, using metals or platinum-group compounds as catalyst. Suitable hydrosilylation processes are described, in EP-A-358 208. The hydrosilylation is carried out using from 0.1 to 10 mole, in particular from 0.2 to 2 mole, of compounds of formulae (1) and (7) per gram-atom of hydrogen atoms bonded directly to silicon atoms.

If organosilanes of formula (13), are used in the process outlined above, these are condensed together with organosilanes or organosiloxanes containing dianhydrohexitol derivatives of formula (1) to give liquid-crystalline organosiloxanes by known processes. This can be carried out by reaction with acids, such as aqueous hydrochloric acid. Processes of this type are described in W. Noll: Chemistry and Technology of Silicones, Academic Press, Orlando, Fla., 1968, pages 191 to 239. The reactions described give a mixture of various molecules.

The invention also relates to the dianhydrohexitol derivatives of formula (14), which are intermediates in the preparation of the liquid-crystalline organosiloxanes containing dianhydrohexitol derivatives. The dianhydrohexitol derivatives can be synthesized by the following process: dianhydrohexitol is esterified with a carboxylic acid or a chloride in the presence of an inert solvent at room temperature or at elevated temperature, if necessary with addition of activating, water-binding or acid-binding auxiliaries, where an olefinic or acetylenic group is already added to the carboxylic acid or the carboxylic acid chloride by known processes.

The present invention also relates to the novel organosilanes of formula (16) above as intermediates in the preparation of the liquid-crystalline organosiloxanes.

The liquid-crystalline organosiloxanes containing dianhydrohexitol derivatives can be used in various ways in optical elements, for decorative purposes and as polarizing colored filters, in particular notch filters. They allow the right-handed or left-handed polarized component of the light to be reflected in certain prespecified spectral regions.

For the above application, it is possible to use both mixtures of the liquid-crystalline organosiloxanes containing dianhydrohexitol derivatives with one another and also mixtures of the organosiloxanes with other liquid-crystalline materials, with materials which do not have a significant adverse effect on the liquid-crystalline properties or pure organosiloxanes containing dianhydrohexitol derivatives. It is also possible to use mixtures with other liquid-crystalline substances, which allows the reflection wavelength to be adjusted between, for example, 400 nm right-handed helix via infra-red right-handed helix, nematic (=infinite pitch), infra-red left-handed helix to 400 nm left-handed helix.

The present invention relates to the mixtures of the liquid-crystalline organosiloxanes containing dianhydrohexitol derivatives with one another and with other liquid-crystalline materials. Further constituents of such mixtures can be monomeric liquid-crystalline methacrylates and/or acrylates. The liquid-crystalline mixtures of components containing methacryloxy and/or acryloxy groups can be polymerized by known processes and also crosslinked given a suitable choice of the components.

The liquid-crystalline organosiloxanes containing dianhydrohexitol derivatives and optional methacryloxy and/or acryloxy groups in the mesogenic radicals of formulae (1) and/or (7) can be three-dimensionally crosslinked. This crosslinking is effected by means of free radicals, which are produced by means of peroxides, by means of UV light or by means of electromagnetic radiation of higher energy than UV light, or thermally. However, the crosslinking can also be effected by means of crosslinking agents containing hydrogen atoms bonded directly to silicon atoms with catalysis by the abovementioned platinum-metal catalysts. It can also be effected cationically or anionically. Crosslinking by means of UV light is preferred. This crosslinking is described in U.S. Pat. No. 5,211,877.

In the examples below, unless otherwise stated, a) all amounts are by weight;

b) all pressures are 0.10 mPa (abs.);
c) all temperatures are 20° C.;
d) HTP=helical twisting power;
e) WOR=reflection wavelength
f) LC=liquid crystal
g) ABChol=cholesteryl ester of 4-allyloxybenzoic acid
h) ABDor=doristeryl ester of 4-allyloxybenzoic acid The dianhydrohexitol derivatives 1–5 were prepared by way of example. They can be prepared by the following, general procedure:

24 mmol of isosorbide and 48 mmol of an ω-alkenyloxy- or ω-alkynyloxy-acid chloride are dissolved in 40 ml of toluene, and the mixture is refluxed for 12 hours. The toluene is removed by vacuum distillation, and the crude product is recrystallized from ethanol or isopropanol.

The dianhydrohexitol derivative 6 was prepared by the following procedure:

5 g (12.95 mmol) of isosorbide bis(4-hydroxy)benzoate and 3 ml of triethylamine are dissolved in 50 ml of acetone, and 3 g (28.7 mmol) of methacryloyl chloride are added dropwise to this mixture at 5°–10° C. The mixture is stirred at room temperature for 2 hours, poured onto ice and acidified by means of dilute HCl. The mixture is extracted twice with 50 ml of tert-butyl methyl ether, and the combined organic phases are washed until neutral and dried over sodium sulfate. The solvent is removed by vacuum distillation, and the crude product is purified by column chromatography on silica gel (eluent: petroleum ether/ethyl acetate 2:1). Yield: 2.34 g.

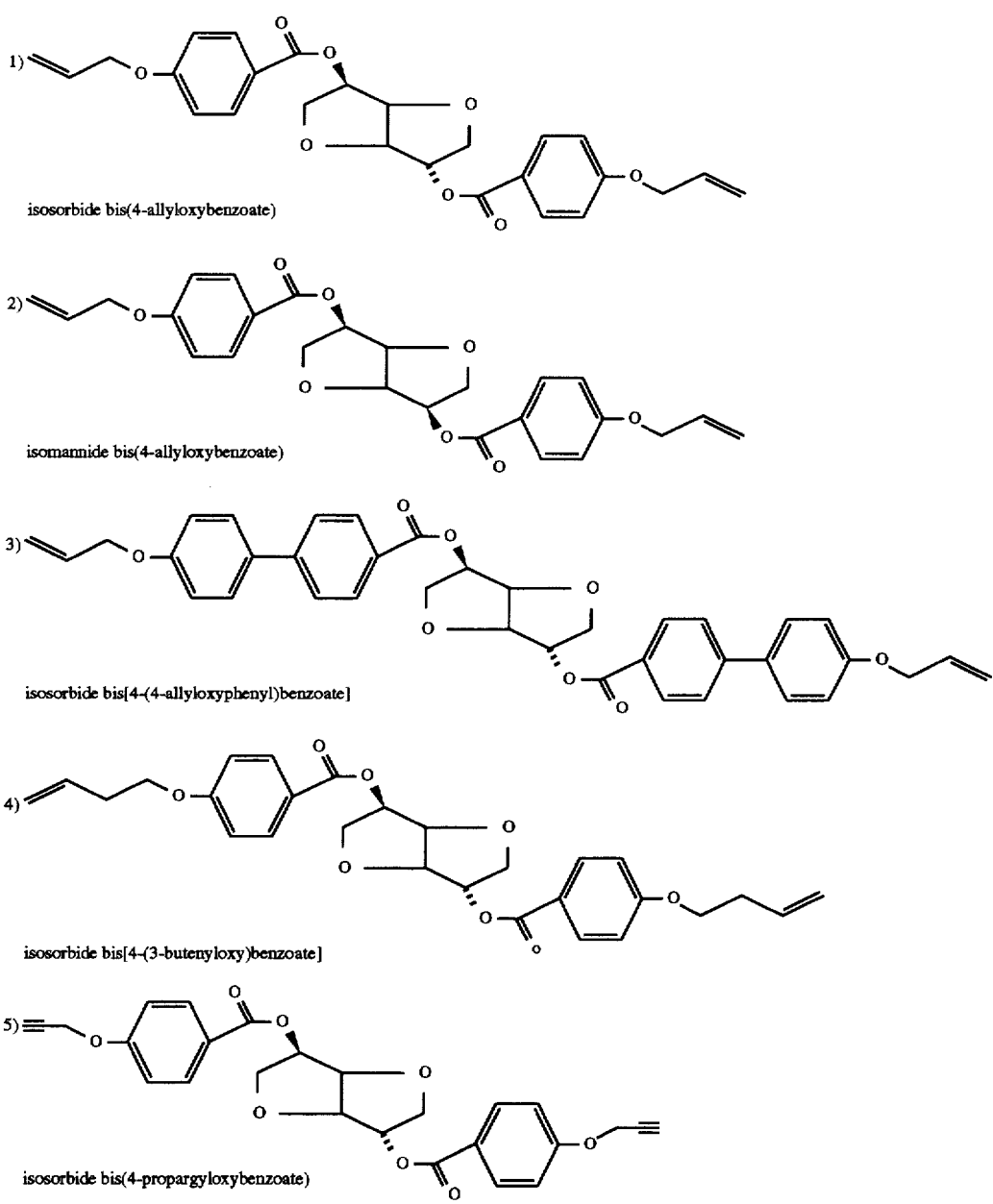

1) isosorbide bis(4-allyloxybenzoate)

2) isomannide bis(4-allyloxybenzoate)

3) isosorbide bis[4-(4-allyloxyphenyl)benzoate]

4) isosorbide bis[4-(3-butenyloxy)benzoate]

5) isosorbide bis(4-propargyloxybenzoate)

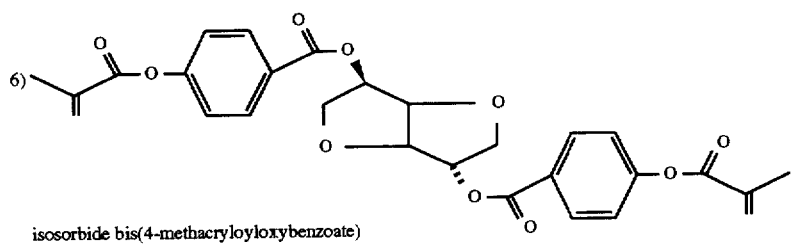

isosorbide bis(4-methacryloyloxybenzoate)

EXAMPLE 1

(Hydrosylylation Compared to Doping with Monomers)

Mixing of 2.73% by weight of isosorbide bis(4-allyloxybenzoate) with the product of the hydrosilylation of pentamethylcyclopentasiloxane and 4-cyanophenyl 4-allyloxybenzoate gives a reflection wavelength of 927 nm. However, if 4-cyanophenyl 4-allyloxybenzoate and isosorbide bis(4-allyloxybenzoate) are hydrosilylated together onto pentamethylcyclopentasiloxane, at an isosorbide derivative concentration of 2.73% by weight, a reflection wavelength of 698 nm is obtained in the product, i.e., a shift of more than 200 nm toward shorter-wave light.

0.07 g (0.15 mmol) of isosorbide bis(4-allyloxybenzoate) (2 mol %, corresponding to 2.73% by weight in the finished LC), and 2 g (7.17 mmol) of 4-cyanophenyl 4-allyloxybenzoate are dissolved in toluene, 0.49 g (1.63 mmol) of pentamethylcyclopentasiloxane and 200 ppm of dicyclopentadienyl platinum dichloride are added, and the mixture is refluxed for 2 hours. The solvent is removed by vacuum distillation. The resultant liquid crystal exhibits a cholesteric phase. After preparation between 2 glass plates, a WOR of 698 nm is obtained at room temperature. Right-handed circular-polarized light is reflected.

COMPARATIVE EXAMPLE 1-1

(Admixture of Isosorbide Bis(4-allyloxybenzoate))

0.273 g of isosorbide bis(4-allyloxybenzoate) (2.73% by weight) are admixed with 9.727 g of the product of the hydrosilylation of 4-cyanophenyl 4-allyloxybenzoate onto pentamethylcyclopentasiloxane, and the resultant cholesteric mixture is prepared between 2 glass plates. A WOR of 927 nm at room temperature is obtained. Right-handed circular-polarized light is reflected.

COMPARATIVE EXAMPLE 1-2

(Admixture of Isosorbide Bis(4-methacryloyloxybenzoate))

5.75 mg of isosorbide bis(4-methacryloyloxybenzoate) (2.74% by weight) are admixed with 204.14 mg of the product of the hydrosilylation of 4-cyanophenyl 4-allyloxybenzoate onto pentamethylcyclopentasiloxane, and the resultant cholesteric mixture is prepared between 2 glass plates. A WOR of 1031 nm at room temperature is obtained. Right-handed circular-polarized light is reflected.

EXAMPLE 2

(Use of Isosorbide Compared with ABDor)

0.48 g (2.0 mmol) of tetramethylcyclotetrasiloxane, 2 g (7.17 mmol, 95 mole %) of 4-cyanophenyl 4-allyloxybenzoate and 0.19 g (0.38 mmol, 5 mole %) of isosorbide bis(4-(3-butenyloxy) benzoate) are dissolved in 20 ml of toluene, and 200 ppm of dicyclopentadienylplatin dichloride are added. The mixture is refluxed for 2 hours, and the solvent is removed by vacuum distillation. After preparation between 2 glass plates, the resultant liquid crystal has a WOR of 427 nm. Right-handed circular-polarized light is reflected.

COMPARATIVE EXAMPLE 2

(Isosorbide Bis(4-(3-butenyloxy)-benzoate) is Replaced by ABDor)

95 mole % of 4-cyanophenyl 4-allyloxybenzoate and 5 mole % of doristeryl 4-allyloxybenzoate are hydrosilylated onto tetramethylcyclotetrasiloxane analogously to Example 2. After preparation between 2 glass plates, the resultant cholesteric liquid crystal has a WOR of 1800 nm. Right-handed circular-polarized light is reflected.

EXAMPLE 3

(Use of Isomannide Compared with ABChol or Tartaric Acid Benzoate)

67 mole % of biphenyl 4-allyloxybenzoate, 30 mole % of cholesterol 4-allyloxybenzoate and 3 mole % of isomannide bis(4-allyloxybenzoate) are hydrosilylated onto pentamethylcyclopentasiloxane analogously to Example 2. After preparation between 2 glass plates, the resultant liquid crystal has a WOR of 515 nm. Left-handed circular-polarized light is reflected.

COMPARATIVE EXAMPLE 3-1

(3 Mole % of Isomannide Bis(4-allyloxybenzoate) are Replaced by ABChol)

67 mole % of biphenyl 4-allyloxybenzoate and 33 mole % of cholesteryl 4-allyloxybenzoate are hydrosilylated onto pentamethylcyclopentasiloxane analogously to Example 2. After preparation between 2 glass plates, the resultant cholesteric liquid crystal has a WOR of 670 nm. Left-handed circular-polarized light is reflected.

COMPARATIVE EXAMPLE 3-2

(3 Mole % of Isomannide Bis(4-allyloxybenzoate) are Replaced by (3R,4R)-(+)-allyl-3,4-bis (benzoyloxy)succinimide)

67 mole % of biphenyl 4-allyloxybenzoate, 30 mole % of cholesteryl 4-allyloxybenzoate and 3 mol % of (3R,4R)-(+)-allyl-3,4-bis(benzoyloxy)succinimide are hydrosilylated onto pentamethylcyclopentasiloxane analogously to Example 2.

After preparation between 2 glass plates, the resultant cholesteric liquid crystal has a WOR of 580 nm. Left-handed circular-polarized light is reflected.

EXAMPLE 4

(Use of Isosorbide Compared with ABDor)

40 mole % of 4-methoxyphenyl 4-allyloxybenzoate, 40 mole % of biphenyl 4-allyloxybenzoate, 18 mole % of doristeryl 4-allyloxybenzoate and 2 mole % of isosorbide bis(4-allyloxybenzoate) are hydrosilylated onto pentamethylcyclopentasiloxane analogously to Example 2. After preparation between 2 glass plates, the resultant liquid crystal has a WOR of 432 nm. Right-handed circular-polarized light is reflected.

COMPARATIVE EXAMPLE 4

(Isosorbide Bis(4-allyloxybenzoate) is Replaced by ABDor)

40 mole % of 4-methoxyphenyl 4-allyloxybenzoate, 40 mole % of biphenyl 4-allyloxybenzoate and 20 mole % of doristeryl 4-allyloxybenzoate are hydrosilylated onto pentamethylcyclopentasiloxane analogously to Example 2. After preparation between 2 glass plates, the resultant cholesteric liquid crystal has a WOR of 562 nm. Right-handed circular-polarized light is reflected.

EXAMPLE 5

(Use of Isomannide Compared with ABChol)

1.0 g (3.33 mmol) of pentamethylcyclopentasiloxane, 3.37 g (6.16 mmol, 37 mole %) of cholesteryl 4-allyloxybenzoate and 1.1 g (3.33 mmol, 20 mole %) of biphenyl 4-allyloxybenzoate are dissolved in 20 ml of toluene, and the reaction mixture is refluxed for 1 hour together with 100 ppm of dicyclopentadienyl platinum dichloride. The mixture is cooled to 50° C., 2.3 g (6.8 mmol, 40 mole %) of 4-(methacryloyloxy)phenyl 4-allyloxybenzoate, 0.23 g (0.49 mmol, 3 mole %) of isomannide bis(4-allyloxybenzoate) and 10 mg of the aluminum salt of N-nitrosophenylhydroxylamine are added, and the mixture is stirred at 70° C. for 1 hour. The solvent is removed by vacuum distillation. After preparation between 2 glass plates, the resultant cholesteric liquid crystal has a WOR of 516 nm. Left-handed circular-polarized light is reflected.

COMPARATIVE EXAMPLE 5

(Isomannide Bis(4-allyloxybenzoate) is Replaced by ABChol)

40 mole % of cholesteryl 4-allyloxybenzoate, 20 mole % of biphenyl 4-allyloxybenzoate and 40 mole % of 4-(methacryloyloxy)phenyl 4-allyloxybenzoate are hydrosilylated onto pentamethylcyclopentasiloxane analogously to Example 6. After preparation between 2 glass plates, the resultant cholesteric liquid crystal has a WOR of 623 nm. Left-handed circular-polarized light is reflected.

EXAMPLE 6

(Use of Isosorbide Compared with ABDor)

95 mole % of 4-cyanophenyl 4-allyloxybenzoate and 5 mole % of isosorbide bis(4-propargyloxybenzoate) are hydrosilylated onto tetramethylcyclotetrasiloxane analogously to Example 2. After preparation between 2 glass plates the resultant liquid crystal has a WOR of 464 nm. Right-handed circular-polarized light is reflected.

COMPARATIVE EXAMPLE 6

(Isosorbide Bis(4-propargyloxybenzoate) is Replaced by ABDor)

Identical to Comparative Example 2-1.

EXAMPLE 7

(Crosslinking of the Liquid Crystal)

1% by weight of 2-methyl-1-[4-(methylthio)phenyl]-2-morpholino-1-propanone (Irgacure 907, Ciba-Geigy) are admixed with the liquid crystal from Example 5, the liquid crystal is aligned between 2 glass plates at 80° C. and conditioned for 1 hour and the sample is irradiated with UV light for 3 minutes. A crosslinked, cholesteric film having a WOR of 520 nm is obtained. Left-handed circular-polarized light is reflected.

COMPARATIVE EXAMPLE 7

The liquid crystal from Comparative Example 5 is crosslinked analogously to Example 7. The cholesteric film has a WOR of 603 nm. Left-handed circular-polarized light is reflected.

EXAMPLE 8

(Crosslinking of the Liquid Crystal and Addition of Monomeric Auxiliaries)

1% by weight of 2-methyl-1-[4-(methylthio)phenyl]-2-morpholino-1-propanone (Irgacure 907 from Ciba-Geigy AG, Switzerland) and 20% by weight of 4-ethylphenyl 4-methacryloyloxybenzoate are admixed with the liquid crystal from Example 5, the liquid crystal is aligned between 2 glass plates at 80° C. and conditioned for 1 hour, and the sample is irradiated with UV light for 3 minutes. A crosslinked, cholesteric film having a WOR of 520 nm is obtained. Left-handed circular-polarized light is reflected.

COMPARATIVE EXAMPLE 8

The liquid crystal from Comparative Example 5 is crosslinked analogously to Example 8. The cholesteric film has a WOR of 626 nm. Left-handed circular-polarized light is reflected.

EXAMPLE 9

(Right-Handed Helical Filter)

0.69 g (2.88 mmol) of tetramethylcyclotetrasiloxane, 2.14 g (5.3 mmol, 53 mole %) of 4-(4-methoxyphenoxycarbonyl) phenyl 4-allyloxybenzoate and 0.33 g (0.69 mmol, 7 mole %) of isosorbide bis(4-allyloxybenzoate) are dissolved in 20 ml of toluene, and the reaction mixture is refluxed for 1 hour together with 100 ppm of dicyclopentadienyl platinum dichloride. The mixture is cooled to 50° C., 1.35 g (6.95 mmol, 40 mole %) of 4-(methacryloyloxyphenyl) 4-allyloxybenzoate and 10 mg of the aluminum salt of N-nitrosophenylhydroxylamine are added, and the mixture is stirred at 70° C. for 1 hour. The solvent is removed by vacuum distillation. 20% by weight of 4-ethyl-phenyl 4-methacryloyloxybenzoate and 2% by weight of 2-methyl-1-[4-(methylthio)phenyl]-2-morpholino-1-propanone (Irgacure 907 from Ciba-Geigy AG, Switzerland) are admixed with the resultant cholesteric liquid crystal at 70° C., and the resultant mixture is prepared between 2 polyimide-coated glass plates at 90° C. After a conditioning

What is claimed is:

1. A liquid-crystalline organosiloxane comprising a dianhydrohexitol moiety selected from the group consisting of

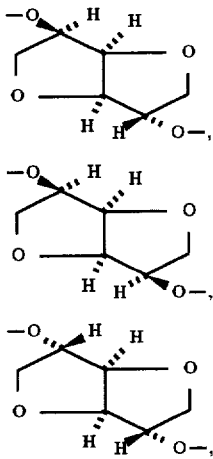

and mixtures thereof as a chiral group.

2. A liquid-crystalline organosiloxane contains, per molecule, at least one Si—C-bound dianhydrohexitol derivative of the formula $$M^1\text{-hexitol-}M^2 \tag{1}$$

where hexitol represents a dianhydrohexitol group, $M^1$ is a radical of the formula

$$R^1\text{—}(A^1)_a\text{—}Z^1_r\text{—}(A^2)_b\text{—}X^1\text{—} \tag{2}$$

and $M^2$ is a radical of formula (2) or a radical of the formula

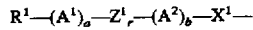
$$R^2\text{—}R^3\text{—}(A^3)_c\text{—}Z^2_s\text{—}(A^4)_d\text{—}X^2\text{—} \tag{3}$$

where, $R^1$ and $R^3$ are each a radical of the formula $C_nH_m$, in which one or more nonadjacent methylene units may be replaced by oxygen atoms or dimethylsilyl radicals, $R^2$ is a polymerizable ethylenically unsaturated or alkoxysiloxy group or cholesteryl radical, doristerol radical, halogen atom, hydrogen atom, hydroxyl group, nitrile group or trialkylsiloxy group whose alkyl radicals each have 1 to 8 carbon atoms, $A^1$, $A^2$, $A^3$ and $A^4$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms, $X^1$ and $X^2$ are identical or different divalent radicals —OCO—, —NHCO—, —CO— or a radical $R^1$, $Z^1$ and $Z^2$ are identical or different divalent radicals —$(CH_2)_q$—, —COO—, —CH=CH—, —N=N—, —N=N(O)—, —OCO—, —$CH_2CO$—, —$COCH_2$—, —$CH_2$—O—, —O—$CH_2$—, —$CH_2$—NH—, —NH—$CH_2$—, —CONH—, —NHCO—, —N=CH— or —CH=N—, a, b, c and d are each identical or different integers having a value of 0, 1, 2 or 3, n is an integer having a value of from 0 to 20, m has the value 2n or (2n–2), if n is at least 2, q is an integer having a value of 1, 2 or 3, and r and s are each an integer having a value of 0 or 1.

3. A liquid-crystalline organosiloxane as claimed in claim 2, wherein the organosiloxane is prepared from units of the formulae

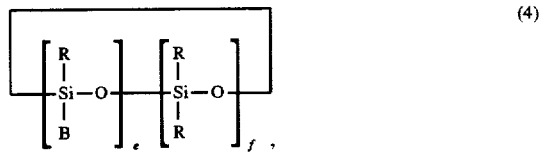

(4)

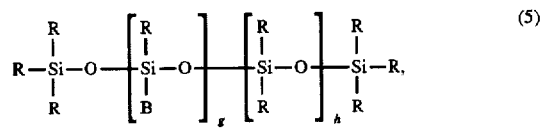

(5)

and

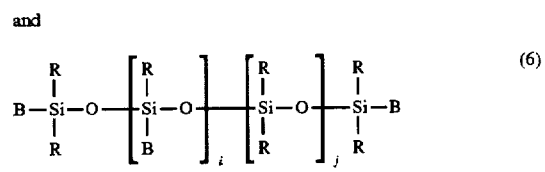

(6)

where

B is a radical of the formula (1) or a radical of the formula

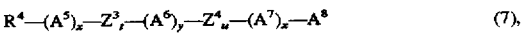
$$R^4\text{—}(A^5)_x\text{—}Z^3_t\text{—}(A^6)_y\text{—}Z^4_u\text{—}(A^7)_z\text{—}A^8 \tag{7},$$

where,

R is an identical or different, substituted or unsubstituted $C_1$- to $C_{18}$-hydrocarbon radical, e and g are each an integer having a value from 1 to 100, f, h, i and j are each an integer having a value from 0 to 100, $R^4$ is as defined for $R^1$, $A^5$, $A^6$ and $A^7$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms, $Z^3$ and $Z^4$ are identical or different divalent radicals —$(CH_2)_q$—, —COO—, —CH=CH—, —N=N—, —N=N(O)—, —OCO—, —$CH_2CO$—, —$COCH_2$—, —$CH_2$—O—, —O—$CH_2$—, —$CH_2$—NH—, —NH—$CH_2$—, —CONH—, —NHCO—, —N=CH—, or —CH=N—, $A^8$ is a saturated or olefinically unsaturated, optionally substituted alkyl, alkoxy or cycloalkyl radical, having 1–6 carbon atoms, cholestane radical, cholesteryl radical, doristerol radical, halogen atom, hydrogen atom, hydroxyl group, nitrile group, (meth)acryloxy group, (meth)acryloxyethyleneoxy group, (meth)acryloxydi(ethyleneoxy) group, (meth) acryloxytri (ethyleneoxy) group, R- or S-tetrahydrofurancarboxylate group or trialkyl- or trialkoxysiloxy group whose alkyl or alkoxy radicals respectively have 1 to 8 carbon atoms, x, y and z are each identical or different integers having a value of 0, 1, 2 or 3, and t and u are each an integer having a value of 0 or 1, with the proviso that the sum e+f is at least 2, and with the further proviso that said liquid-crystalline organosiloxane contains at least one radical of formula (1).

4. A process for the preparation of liquid-crystalline organosiloxanes containing a dianhydrohexitol moiety derivatives as claimed in claim 1, which comprises reacting organosiloxanes and/or organosilanes which can be condensed to form organosiloxanes with alkenes or alkynes of the formula $$M^1\text{-hexitol-}M^2 \quad (1)$$

where hexitol represents a dianhydrohexitol group, $M^1$ is a radical of the formula $$R^1-(A^1)_a-Z^1_r-(A^2)_b-X^1- \quad (2)$$

and $M^2$ is a radical of the formula (2) or a radical of the formula $$R^2-R^3-(A^3)_c-Z^2_s-(A^4)_d-X^2- \quad (3)$$

where $R^1$ and $R^3$ are each a radical of the formula $C_nH_m$, in which one or more nonadjacent methylene units may be replaced by oxygen atoms or dimethylsilyl radicals, $R^2$ is a polymerizable ethylenically unsaturated or alkoxysiloxy group or cholesteryl radical, doristerol radical, halogen atom, hydrogen atom, hydroxyl group, nitrile group or trialkylsiloxy group whose alkyl radicals each have 1 to 8 carbon atoms, $A^1$, $A^2$, $A^3$ and $A^4$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms, $X^1$ and $X^2$ are identical or different divalent radicals —OCO—, —NHCO—, —CO— or a radical $R^1$, $Z^1$ and $Z^2$ are identical or different divalent radicals —(CH$_2$)$_q$—, —COO—, —CH=CH—, —N=N—, —N=N(O)—, —OCO—, —CH$_2$CO—, —COCH$_2$—, —CH$_2$—O—, —O—CH$_2$—, —CH$_2$—NH—, —NH—CH$_2$—, —CONH—, —NHCO—, —N=CH—, or —CH=N—, a, b, c and d are each identical or different integers having a value of 0, 1, 2 or 3, n is an integer having a value of from 0 to 20, m has the value 2n, or (2n–2) if n is at least 2, q is an integer having a value of 1, 2 or 3, and r and s are each an integer having a value of 0 or 1 and, optionally, of the formula $$R^4-(A^6)_x-Z^3_t-(A^6)_y-Z^4_u-(A^7)_z-A^8 \quad (7),$$

where,

R is an identical or different, substituted or unsubstituted $C_1$- to $C_{18}$-hydrocarbon radical, e and q are each an integer having a value from 1 to 100, f, h, i, and j are each an integer having a value from 0 to 100, $R^4$ is as defined for $R^1$, $A^5$, $A^6$ and $A^7$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms, $Z^3$ and $Z^4$ are identical or different divalent radicals —CH$_2$—, —COO—, —CH=CH—, —N=N—, —N=N(O)—, —OCO—, —CH$_2$CO—, —COCH$_2$—, —CH$_2$—O—, —O—CH$_2$—, —CH$_2$—NH—, —NH—CH$_2$—, —CONH—, —NHCO—, —N=CH—, or —CH=N—, $A^8$ is a saturated or olefinically unsaturated, optionally substituted alkyl, alkoxy or cycloalkyl radical, having 1-16 carbon atoms, cholestane radical, cholesteryl radical, doristerol radical, halogen atom, hydrogen atom, hydroxyl group, nitrile group, (meth)acryloxy group, (meth)acryloxyethyleneoxy group, (meth) acryloxydi(ethyleneoxy) group, (meth) acryloxytri(ethyleneoxy) group, R- or S-tetrahydrofurancarboxylate group or trialkyl- or trialkoxysiloxy group whose alkyl or alkoxy radicals respectively have 1 to 8 carbon atoms, x, y and z are each identical or different integers having a value of 0, 1, 2 or 3, and t and u are each an integer having a value of 0 or 1, with the proviso that the sum e+f is at least 2.

5. A process as claimed in claim 4, in which organosiloxanes of the formulae

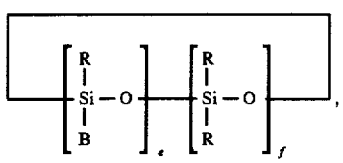

(4)

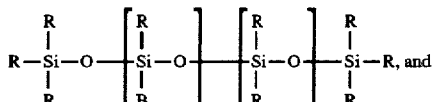

(5)

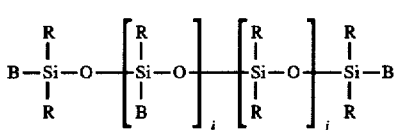

(6)

and/or organosilanes of the formula $$HRSiY^1Y^2 \quad (13)$$

are reacted with compounds of the formula $$M^3\text{-hexitol-}M^2 \quad (14)$$

and, optionally, compounds of the formula $$R^5-(A^5)_x-Z^3_t-(A^6)_y-Z^4_u-(A^7)_z-A^8 \quad (15)$$

and, if organosilanes of the formula (13) are used, the resultant organosilanes of the formula $$BRSiY^1Y^2 \quad (16)$$

are condensed, where, $M^3$ is a radical of the formula $$R^6-(A^1)_a-Z^1_{r-(A^2)_b}-X^1- \quad (17)$$

$Y^1$ is a condensable group, $Y^2$ is a condensable group or a radical R $R^5$ and $R^6$ are each a radical of the formula $C_\alpha H_\beta$, in which one or more nonadjacent methylene units may be replaced by oxygen atoms or dimethylsilyl radicals, and where α is an integer having a value of from 2 to 20, and β has the value 2α–1 or 2α–3, and R is an identical or different, optionally substituted $C_1$- to $C_{18}$-hydrocarbon radical, $M^2$ is a radical of formula $$R^1-(A^1)_a-Z^1_r-(A^2)_b-X^1- \quad (2)$$

or a radical of the formula $$R^2-R^3-(A^3)_c-Z^2_s-(A^4)_d-X^2- \quad (3)$$

where
- $R^1$ and $R^3$ are each a radical of the formula $C_nH_m$, in which one or more nonadjacent methylene units may be replaced by oxygen atoms or dimethylsilyl radicals,
- $R^2$ is a polymerizable ethylenically unsaturated or alkoxysiloxy group or cholesteryl radical, doristerol radical, halogen atom, hydrogen atom, hydroxyl group, nitrile group or trialkylsiloxy group whose alkyl radicals each have 1 to 8 carbon atoms,
- $A^1$, $A^2$, $A^5$, $A^6$, $A^7$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms,
- $A^8$ is a saturated or olefinically unsaturated, optionally substituted alkyl, alkoxy or cycloalkyl radical, having 1–16 carbon atoms, cholestane radical, cholesteryl radical, doristerol radical, halogen atom, hydrogen atom, hydroxyl group, nitrile group, (meth)acryloxy group, (meth)acryloxyethyleneoxy group, (meth)acryloxydi(ethyleneoxy) group, (meth)acryloxytri(ethyleneoxy) group, R- or S-tetrahydrofurancarboxylate group or trialkyl- or trialkoxysiloxy group whose alkyl or alkoxy radicals respectively have 1 to 8 carbon atoms,
- $Z^1$, $Z^2$, $Z^3$, $Z^4$ are identical or different divalent radicals —$(CH_2)_q$—, —COO—, —CH=CH—, —N=N—, —N=N(O)—, —OCO—, —CH$_2$CO—, —COCH$_2$—, —CH$_2$—O—, —O—CH$_2$—, —CH$_2$—NH—, —NH—CH$_2$—, —CONH—, —NHCO—, —N=CH—, or —CH=N—,
- B is a radical of the formula (1) or a radical of the formula $$R^4-(A^5)_x-Z^3_t-(A^6)_y-Z^4_u-(A^7)_z-A^8 \quad (7)$$

- $X^1$ and $X^2$ are identical or different divalent radicals —OCO—, —NHCO—, —CO— or a radical $R^1$,
- a, b, c, and d are each identical or different integers having a value of 0, 1, 2 or 3,
- e and g are each an integer having a value from 1 to 100,
- f, h, i and j are each an integer having a value from 0 to 100,
- r, s, t and u are each an integer having a value of 0 or 1,
- r is an integer having a value of 0 or 1,
- x, y and z are each identical or different integers having a value of 0, 1, 2 or 3.

6. A liquid-crystalline organosiloxane as claimed in claim 1, further comprising mesogenic radicals which enable free radical or ionic crosslink.

7. An optical element comprising a liquid-crystalline organosiloxane as claimed in claim 1.

8. A dianhydrohexitol derivative of the formula $$M^3\text{-hexitol-}M^2 \quad (14)$$

in which $M^2$ is a radical of the formula $$R^1-(A^1)_a-Z^1_r-(A^2)_b-X^1- \quad (2)$$

or of the formula $$R^2-R^3-(A^3)_c-Z^2_s-(A^4)_d-X^2- \quad (3)$$

where
- $R^1$ and $R^3$ are each a radical of the formula $C_nH_m$, in which one or more nonadjacent methylene units may be replaced by oxygen atoms or dimethylsilyl radicals,
- $R^2$ is a polymerizable ethylenically unsaturated or alkoxysiloxy group or cholesteryl radical, doristerol radical, halogen atom, hydrogen atom, hydroxyl group, nitrile group or trialkylsiloxy group whose alkyl radicals each have 1 to 8 carbon atoms,
- $A^1$, $A^2$, $A^3$ and $A^4$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms,
- $X^1$ and $X^2$ are identical or different divalent radicals —OCO—, —NHCO—, —CO— or a radical of $R^1$,
- $Z^1$ and $Z^2$ are identical or different divalent radicals —$(CH_2)_q$—, —COO—, —CH=CH—, —N=N—, —N=N(O)—, —OCO—, —CH$_2$CO—, —COCH$_2$—, —CH$_2$—O—, —O—CH$_2$—, —CH$_2$—NH—, —NH—CH$_2$—, —CONH—, —NHCO—, —N=CH—, or —CH=N—,
- a, b, c and d are each identical or different integers having a value of 0, 1, 2 or 3,
- n is an integer having a value of from 0 to 20,
- M has the value 2n or (2n−2), if n is at least 2,
- q is an integer having a value of 1, 2 or 3, and
- r and s are each an integer having a value of 0 or 1

$M^3$ is a radical of the formula $$R^6-(A^1)_a-Z^1_r-(A^2)_b-X^1- \quad (17)$$

$R^6$ is a radical of the formula $C_\alpha H_\beta$, in which one or more nonadjacent methylene units may be replaced by oxygen atoms or dimethyl silyl radicals, and where
- α is an integer having a value of from 2 to 20, and
- β0 has the value 2α−1 or 2β−3.

9. An organosilane of the formula $$BRSiY^1Y^2 \quad (16)$$

in which
- $Y^1$ is a condensable group,
- $Y^2$ is a condensable group or a radical R
- B is a radical of the formula (1) or formula (7), where R is an identical or different, optionally substituted $C_1$- to $C_{18}$-hydrocarbon radical; wherein formula (1) is $$M^1\text{-hexitol-}M^2$$

where
hexitol represents a dianhydrohexitol group, $M^1$ is a radical of the formula $$R^1-(A^1)_a-Z^1_r-(A^2)_b-X^1- \quad (2)$$

and
$M^2$ is a radical of the formula (2) or a radical of the formula

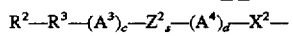

where
- $R^1$ and $R^3$ are each a radical of the formula $C_nH_m$, in which one or more nonadjacent methylene units may be replaced by oxygen atoms or dimethylsilyl radicals,
- $R^2$ is a polymerizable ethylenically unsaturated or alkoxysiloxy group or cholesteryl radical, doristerol radical, halogen atom, hydrogen atom, hydroxyl group, nitrile group or trialkylsiloxy group whose alkyl radicals each have 1 to 8 carbon atoms,
- $A^1$, $A^2$, $A^3$ and $A^4$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms.
- $X^1$ and $X^2$ are identical or different divalent radicals —OCO—, —NHCO—, —CO— or a radical of $R^1$,
- $Z^1$ and $Z^2$ are identical or different divalent radicals —(CH$_2$)$_q$—, —COO—, —CH=CH—, —N=N—, —N=N(O)—, —OCO—, —CH$_2$CO—, —COCH$_2$—, —CH$_2$—O—, —O—CH$_2$—, —CH$_2$—NH—, —NH—CH$_2$—, —CONH—, —NHCO—, —N=CH—, or —CH=N—,
- a, b, c and d are each identical or different integers having a value of 0, 1, 2 or 3,
- n is an integer having a value of from 0 to 20,
- m has the value 2n, or (2n–2) if n is at least 2,
- q is an integer having a value of 1, 2 or 3, and
- r and s are each an integer having a value of 0 or 1, and wherein formula (7) is

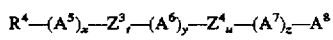

where,

- R is an identical or different, substituted or unsubstituted $C_1$- to $C_{18}$-hydrocarbon radical,
- e and q are each an integer having a value from 1 to 100,
- f, h, i and l; are each an integer having a value from 0 to 100,
- $R^4$ is as defined for $R^1$,
- $A^5$, $A^6$ and $A^7$ are identical or different divalent radicals, 1,4-phenylene, 1,4-cyclohexylene, substituted arylenes having 6 to 10 carbon atoms, substituted cycloalkylenes having 3 to 10 carbon atoms or heteroarylenes having 5 to 10 carbon atoms,
- $Z^3$ and $Z^4$ are identical or different divalent radicals —(CH$_2$)$_q$—, —COO—, —CH=CH—, —N=N—, —N=N(O)—, —OCO—, —CH$_2$CO—, —COCH$_2$—, —CH$_2$—O—, —O—CH$_2$—, —CH$_2$—NH—, —NH—CH$_2$—, —CONH—, —NHCO—, —N=CH—, or —CH=N—,
- $A^8$ is a saturated or olefinically unsaturated, optionally substituted alkyl, alkoxy or cycloalkyl radical, having 1–6 carbon atoms, cholestane radical, cholesteryl radical, doristerol radical, halogen atom, hydrogen atom, hydroxyl group, nitrile group, (meth)acryloxy group, (meth)acryloxyethyleneoxy group, (meth)acryloxydi(ethyleneoxy group, (meth) acryloxytri(ethyleneoxy) group, R- or S-tetrahydrofurancarboxylate group or trialkyl- or trialkoxysiloxy group whose alkyl or alkoxy radicals respectively have 1 to 8 carbon atoms,
- x, y and z are each identical or different integers having a value of 0, 1, 2 or 3, and
- t and u are each an integer having a value of 0 or 1, with the proviso that the sum e+f is at least 2, and with the further proviso that said liquid-crystalline organosiloxane contain at least one radical of formula (1).

\* \* \* \* \*

UNITED STATES PATENT AND TRADEMARK OFFICE
CERTIFICATE OF CORRECTION

PATENT NO. : 5,788,880
DATED : August 4, 1998
INVENTOR(S) : CHRISTIAN SCHIERLINGER et al.

It is certified that error appears in the above-identified patent and that said Letters Patent is hereby corrected as shown below:

Column 15, Line 34, Claim 2: delete "group" and insert --groups--.

Column 15, Line 52, Claim 2: after "$A^3$" delete --$_3$--

Column 15, Line 55, Claim 2: delete "3" and insert --1--.

Column 17, Line 36, Claim 4: "$Z^1$ and $Z^2$" should begin a new line.

Column 17, Line 56, Claim 4: delete "q" and insert --g--.

Column 17, Line 67, Claim 4: delete "-$CH_2$--" and insert --$(CH_2)g$-

Column 18, Line 57, Claim 5: formula should read $R^6 - (A^1)_a - Z^1_r - (A^2)_b - X^1 -$ Column 19, Line 9, Claim 5: formula should read

UNITED STATES PATENT AND TRADEMARK OFFICE
CERTIFICATE OF CORRECTION

PATENT NO. : 5,788,880
DATED : August 4, 1998
INVENTOR(S) : CHRISTIAN SCHIERLINGER et al.

It is certified that error appears in the above-identified patent and that said Letters Patent is hereby corrected as shown below:

Column 20, Line 34, Claim 8: delete "M" (upper case "M") and insert --m--.

Column 20, Line 46, Claim 8: delete "β0" and insert --β--.

Column 22, Line 3, Claim 9: delete "q" and insert --g--.

Column 22, Line 4, Claim 9: delete "l" and insert --j--.

Signed and Sealed this

Ninth Day of March, 1999

Attest:

Attesting Officer

Q. TODD DICKINSON

Acting Commissioner of Patents and Trademarks